US012259121B2

(12) United States Patent
Nguyen et al.

(10) Patent No.: US 12,259,121 B2
(45) Date of Patent: Mar. 25, 2025

(54) LIGHT ASSEMBLY WITH SACRIFICIAL LENS

(71) Applicant: Axxiom Manufacturing, Inc., Fresno, TX (US)

(72) Inventors: Phuong Taylor Nguyen, Richmond, TX (US); Jeffrey Wayne Hummel, Alvin, TX (US); Bryan Barbin, Raymond, NH (US)

(73) Assignee: Axxiom Manufacturing, Inc., Fresno, TX (US)

( * ) Notice: Subject to any disclaimer, the term of this patent is extended or adjusted under 35 U.S.C. 154(b) by 0 days.

(21) Appl. No.: 18/587,409

(22) Filed: Feb. 26, 2024

(65) Prior Publication Data

US 2024/0295315 A1 Sep. 5, 2024

Related U.S. Application Data

(60) Provisional application No. 63/449,847, filed on Mar. 3, 2023.

(51) Int. Cl.

| | |
|---|---|
| ***F21V 33/00*** | (2006.01) |
| ***B24C 5/02*** | (2006.01) |
| ***B24C 9/00*** | (2006.01) |
| ***F21V 5/00*** | (2018.01) |
| ***F21V 15/00*** | (2015.01) |
| ***F21V 29/505*** | (2015.01) |
| ***F21V 29/83*** | (2015.01) |
| ***F21W 131/402*** | (2006.01) |

(52) U.S. Cl.

CPC ................ *F21V 33/00* (2013.01); *B24C 5/02* (2013.01); *B24C 9/00* (2013.01); *F21V 5/008* (2013.01); *F21V 15/00* (2013.01); *F21V 29/505* (2015.01); *F21V 29/83* (2015.01); *F21W 2131/402* (2013.01)

(58) Field of Classification Search

CPC ........................................................ G02B 1/14

See application file for complete search history.

(56) References Cited

U.S. PATENT DOCUMENTS

| | | | | |
|---|---|---|---|---|
| 4,291,839 | A * | 9/1981 | Brett | B05B 15/00 239/289 |
| 5,873,647 | A * | 2/1999 | Kurtz | B24C 5/02 362/101 |
| 6,536,045 | B1 * | 3/2003 | Wilson | G02B 1/11 2/424 |
| 9,651,224 | B1 * | 5/2017 | Burgess | F21V 5/04 |
| 2018/0267212 | A1 * | 9/2018 | Contreras | G02C 7/02 |
| 2018/0274778 | A1 * | 9/2018 | Fulkerson | F21V 23/003 |

FOREIGN PATENT DOCUMENTS

| | | | |
|---|---|---|---|
| KR | 20170072713 | A * | 6/2017 |

* cited by examiner

*Primary Examiner* — Alexander K Garlen

(74) *Attorney, Agent, or Firm* — Kearney, McWilliams & Davis, PLLC; John M. DeBoer

(57) ABSTRACT

A light assembly that includes a main housing having an illumination module disposed within the main housing. There is an end cap coupled with the main housing in a manner to form a lens cavity proximate a forward end of the illumination module. There is a sacrificial lens disposed in the lens cavity. The sacrificial lens includes a removable layer.

19 Claims, 9 Drawing Sheets

LIGHT ASSEMBLY WITH SACRIFICIAL LENS

BACKGROUND

Field of the Disclosure

This disclosure generally pertains to industrious applications, such as abrasive blasting, particularly in times where additional light may be useful to an operator.

Background of the Disclosure

Abrasive blasting is the process of forcibly propelling a high pressure, high velocity stream of abrasive material against a surface in order to smooth a rough surface, roughen a smooth surface, shape a surface, or remove surface materials, such as contaminants, paint, etc. The stream of abrasive material may be wet or dry.

FIG. 1 illustrates a typical abrasive blasting process (or system) 100. One particular process commonly known as sand-blasting (a form of dry media blasting) has been used for decades, to clean or otherwise prepare various types of structural surfaces. In this type of process 100, a supply of sand (or other types of particles, such as grit or the like) is mixed with a fast-moving stream of air, usually in a mixer or valve. The sand particulate becomes entrained in the air, and the resultant air-sand mixture 106 emerges at high speed from a nozzle 105 at the end of a blast hose 104. The mixture 106 is highly abrasive, and sand-blasting can be used to remove even strongly-adhered compounds (e.g., paint, etc.) from various types of structural surfaces 108.

The discharge of the air-sand mixture 106 is hazardous for multiple reasons. First, particulate from the discharge, and as well as the blasted-surface, will linger in the air in the form of a cloud 107, making breathing difficult. As such, a breathing hood or suit 101 may be worn by an operator 102 (the suit 101 may be fed breathing air 103).

However, the suit 101 may obscure the vision of the operator 102, which is problematic in areas where lighting is limited. As such, a light assembly 116 may be coupled with the blast hose 104 in some fashion, whereby a beam of light 118 helps illuminate the blast against surface 108.

A conventional light assembly 116 uses a lens (not viewable here) that—over time—becomes pitted and obscured via being hit by floating or rebounded mixture 107, which then results in reduced lighting via diffusion of the beam 118. In order to remedy the problem, the operator 102 needs to stop the operation, remove safety equipment, dissemble multiple components, and replace the lens. It is not uncommon for this to have to occur in a repair shop, as the operator 102 is usually not carrying around maintenance tools or replacement parts.

Sometimes more light would be beneficial, but LED lighting (or comparable lighting) creates high amounts of heat that requires dissipation. Conventional light assemblies are constrained and offer very little in the way of dealing with high amounts of heat.

A need exists in the art for an abrasive blasting system and process that may have improved illumination, and the ability to easily, rapidly, and repeatedly remove and replace a lens. A need exists for improved heat dissipation from LED lighting.

SUMMARY

Embodiments of the disclosure pertain to a light assembly that includes a main housing. There may be an illumination module disposed within the main housing. The assembly may have an end cap coupled with the main housing. The coupling may be in a manner to form a lens cavity, which may be proximate a forward end of the illumination module. There may be one or more lens-type pieces in the lens cavity. For example, there may be a primary lens disposed in an innermost portion of the lens cavity. There may be a sacrificial lens disposed proximate or adjacent the primary lens in an outermost portion of the lens cavity.

In aspects, the sacrificial lens may include a plurality of removable layers. One or more of the plurality of removable layers may have a respective outer rim detachably coupled with a pliable sheet. The pliable sheet may be generally thin, such as having a thickness in a range of 2 mils to 8 mils. One or more of the pliable sheets may have a pull tab extending out of the main housing. One or more of the pliable sheets may not have pull tab. Analogously one or more pliable sheets may not have a detachable rim.

The main housing may include an at least one recessed inner surface configured with a vent. The illumination module may have an illumination module housing configured with an outer surface. There may be a passageway between an outer surface and the at least one recessed inner surface. In aspects, during operation of the light assembly the passageway may facilitate cooling of the illumination module.

There may be a mount coupled with the main housing. One or more flexible members, such as a spacer, insert, bumper, or the like, may be disposed between the main housing and the mount. The mount may be coupled directly to a hose or the like, or to a mount feature of a carrier assembly (which may then be disposed around the hose).

Yet other embodiments of the disclosure may pertain to an abrasive blasting system having a blast hose and a light assembly coupled with the blast hose. The light assembly may include one or more of: a main housing; a mount coupled between the blast hose and the main housing; an illumination module disposed within the main housing; an end cap coupled with the main housing in a manner to form a lens cavity proximate a forward end of the illumination module; a primary lens disposed in an innermost portion of the lens cavity; or a sacrificial lens disposed proximate or adjacent the primary lens in an outermost portion of the lens cavity. The sacrificial lens may include a plurality of removable layers. The illumination module may include an insert or safety lens. The insert or safety lens may be proximate the primary lens. The insert or safety lens may be disposed between the primary lens and the sacrificial lens. In some aspects, the sacrificial lens may include the insert or safety lens (akin to a layer or sheet thereof).

These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein.

DETAILED DESCRIPTION

Figure 1:
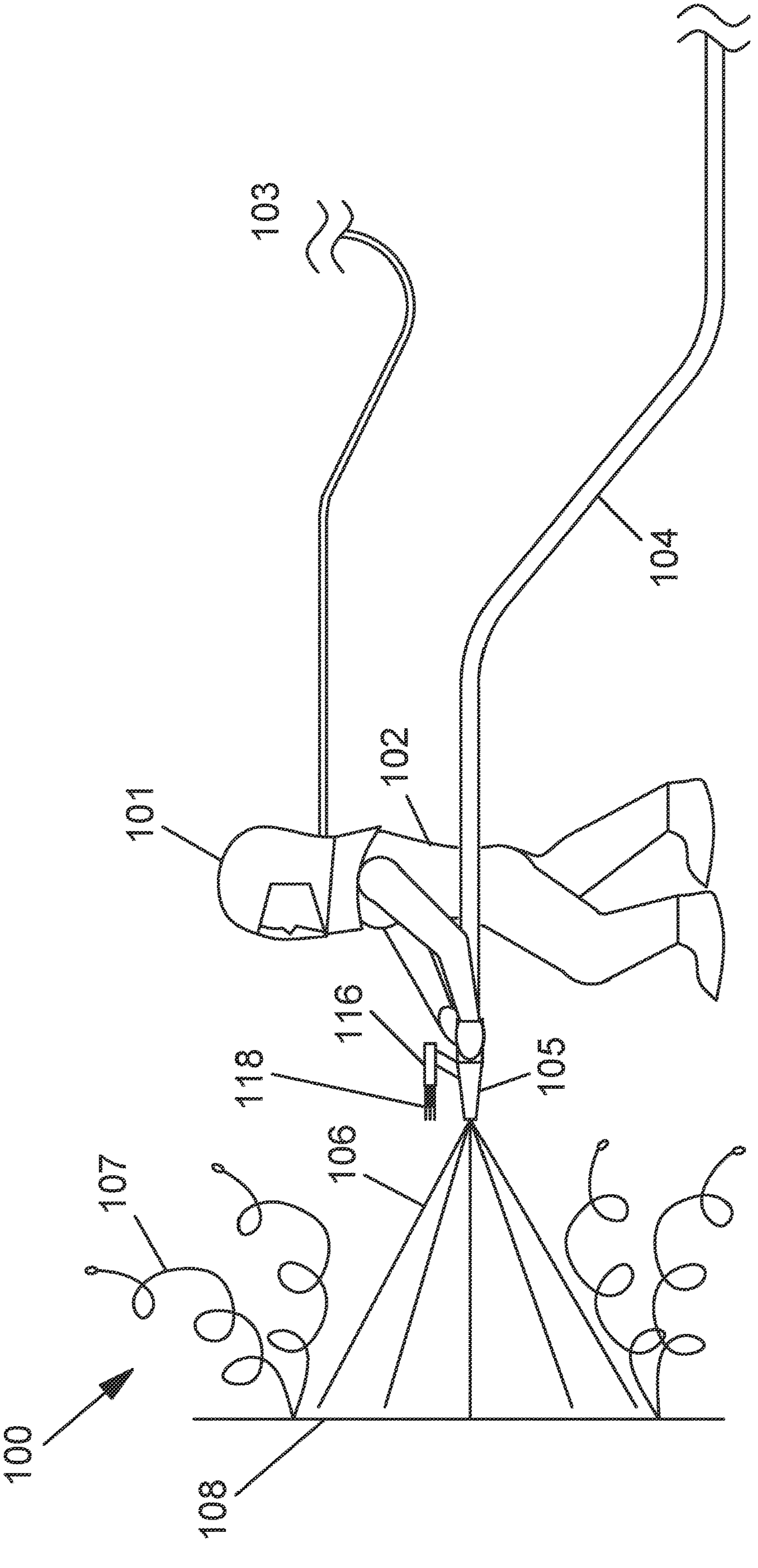
Figure 1 (Prior Art)
FIG. 1 shows a general side view of a conventional blasting system.

Regardless of whether presently claimed herein or in another application related to or from this application, herein disclosed are novel apparatuses, units, systems, and methods that may pertain to abrasive blasting, details of which are described herein.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, PTFE between threads, and the like. The make and manufacture of any particular component, subcomponent, etc., may be as would be apparent to one of skill in the art, such as molding, forming, press extrusion, machining, or additive manufacturing. Embodiments of the disclosure provide for one or more components to be new, used, and/or retrofitted to existing machines and systems.

Various equipment may be in fluid communication directly or indirectly with other equipment. Fluid communication may occur via one or more transfer lines and respective connectors, couplings, valving, piping, and so forth. Fluid movers, such as pumps, may be utilized as would be apparent to one of skill in the art.

Numerical ranges in this disclosure may be approximate, and thus may include values outside of the range unless otherwise indicated. Numerical ranges include all values from and including the expressed lower and the upper values, in increments of smaller units. As an example, if a compositional, physical or other property, such as, for example, molecular weight, viscosity, melt index, etc., is from 100 to 1,000. it is intended that all individual values, such as 100, 101, 102, etc., and sub ranges, such as 100 to 144, 155 to 170, 197 to 200, etc., are expressly enumerated. It is intended that decimals or fractions thereof be included. For ranges containing values which are less than one or containing fractional numbers greater than one (e.g., 1.1, 1.5, etc.), smaller units may be considered to be 0.0001, 0.001, 0.01, 0.1, etc. as appropriate. These are only examples of what is specifically intended, and all possible combinations of numerical values between the lowest value and the highest value enumerated, are to be considered to be expressly stated in this disclosure. Numerical ranges are provided within this disclosure for, among other things, the relative amount of reactants, surfactants, catalysts, etc. by itself or in a mixture or mass, and various temperature and other process parameters.

Terms

The term "connected" as used herein may refer to a connection between a respective component (or subcomponent) and another component (or another subcomponent), which may be fixed, movable, direct, indirect, and analogous to engaged, coupled, disposed, etc., and may be by screw, nut/bolt, weld, and so forth. Any use of any form of the terms "connect", "engage", "couple", "attach", "mount", etc. or any other term describing an interaction between elements is not meant to limit the interaction to direct interaction between the elements and may also include indirect interaction between the elements described.

The term "pipe", "conduit", "line", "tubular", or the like as used herein may refer to any fluid transmission means, and may (but need not) be tubular in nature. The term may also apply to other forms of transmission, such as electrical.

The term "utility fluid" as used herein may refer to a fluid used in connection with the operation of an abrasive blasting device, such as a grit (sand), air, or water. The utility fluid may be for blasting, heating, cooling, or other type of utility. 'Utility fluid' may also be referred to and interchangeable with 'service fluid' or comparable.

The term "mounted" as used herein may refer to a connection between a respective component (or subcomponent) and another component (or another subcomponent), which may be fixed, movable, direct, indirect, and analogous to engaged, coupled, disposed, etc., and may be by screw, nut/bolt, weld, and so forth.

The term "deadman" as used herein may refer to an operable system or assembly utilizing some form of signal device or comparable mechanism that, upon release of the 'deadman', results in shutdown. With respect to a blasting operation, release of the deadman may refer to a shutdown of media transfer through a blast line.

The term "convection" as used herein may refer to movement caused within a fluid (such as air) by the tendency of hotter and therefore less dense material to rise, and colder, denser material to sink under the influence of gravity, which consequently results in transfer of heat.

The term "natural convection" (or sometimes "free convection") as used herein may refer to a mechanism, or type of mass and heat transport, in which fluid motion may be generated by density differences in the fluid occurring as a result of temperature gradients, but not by any external source (like a pump, fan, suction device, etc.). In natural convection, fluid surrounding a heat source receives heat and by thermal expansion becomes less dense and rises or moves.

Figure 2A:
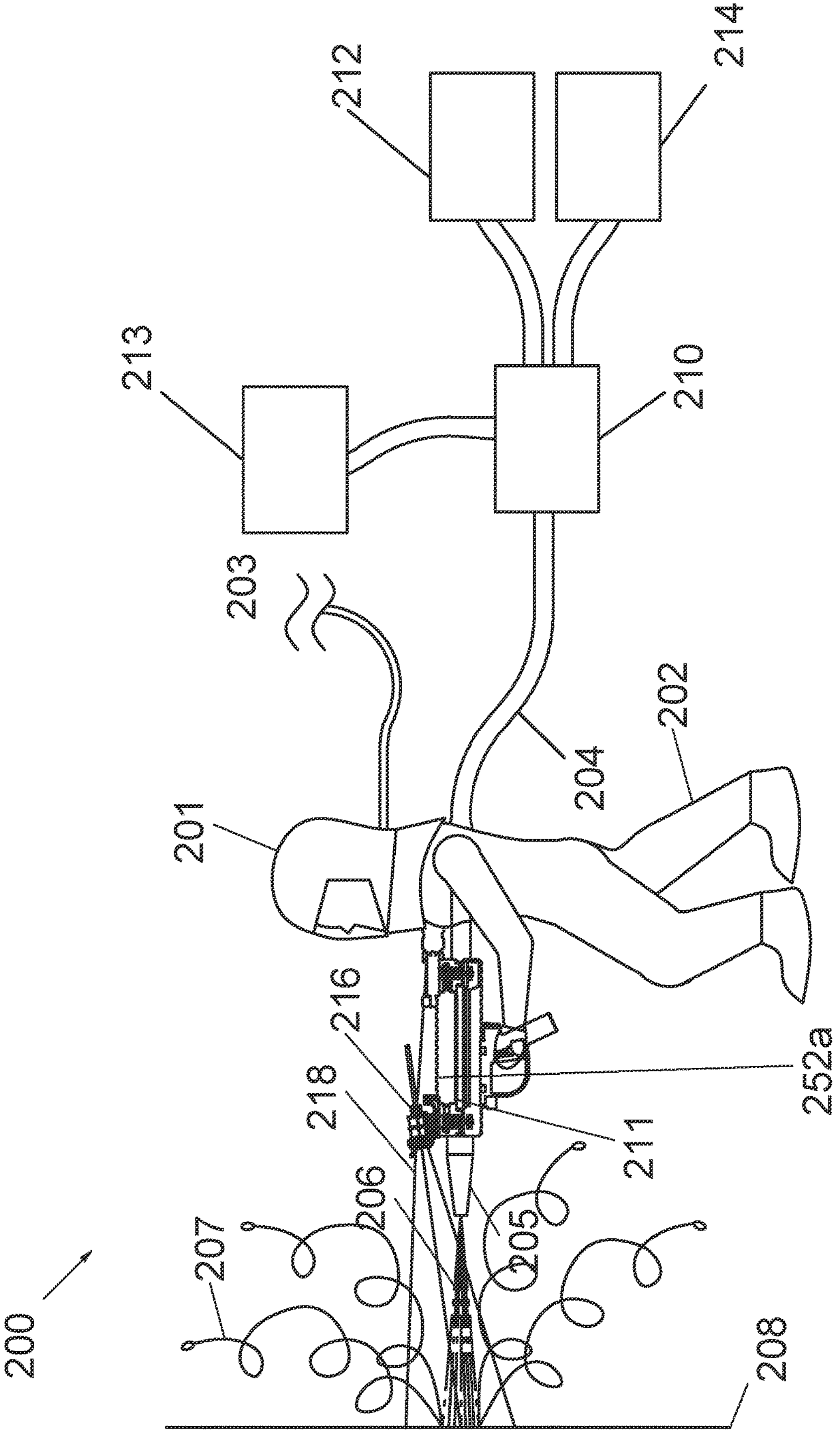
FIG. 2A shows a process diagram view of an abrasive blasting system in a blast mode according to embodiments of the disclosure.
Figure 2B:
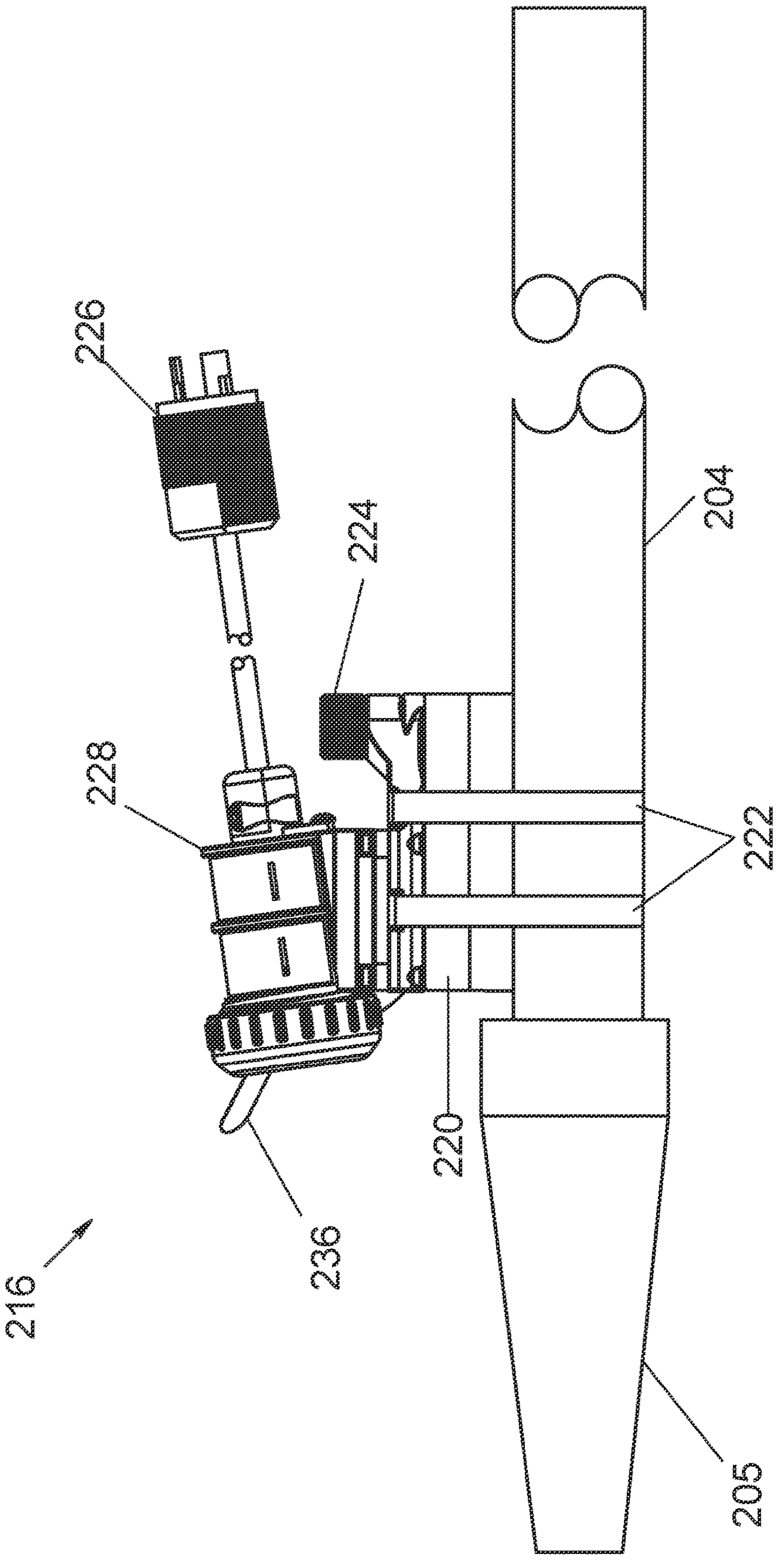
FIG. 2B shows an up-close side view of a light assembly coupled to a blast hose according to embodiments of the disclosure.

Referring now to FIGS. 2A and 2B together, a process diagram view of an abrasive blasting system in a blast mode and an up-close side view of a light assembly coupled to a blast hose, respectively, illustrative of embodiments disclosed herein, are shown.

FIGS. 2A and 2B together illustrate an embodiment of an abrasive blasting process (or system) 200, for which a supply of sand (or other types of particles, such as grit or the like) 214 may be mixed with a fast-moving fluid stream 212, usually in a mixer or valve 210. Although described by way of example as air, the fluid stream 212 may be other materials, such as water and the like. The sand particulate 214 may be entrained in the air 212, and the resultant air-sand mixture 206 emerges at high speed from a nozzle 205 at the end of a blast hose 204. Sometimes a wet blast may be desired, and in that event a water source 213 may be coupled with the mixer 213. A resultant mixture 206 from the mixer 210 may be highly abrasive, and the blast 206 may remove even strongly-adhered compounds (e.g., paint, etc.) from a structural surface(s) 208.

The discharge of the mixture 206 from a nozzle 205 (attached to blast hose 204) may be hazardous for multiple reasons. First, particulate from the discharge, and as well as the blasted-surface, may linger in the air in the form of a cloud of floating or rebounded debris 207, making breathing difficult. As such, a breathing hood or suit 201 may be worn by an operator 202 (the suit 201 may be fed breathing air 203).

For times when vision of the operator 202 might be reduced or impaired, such as limited lighting or darkness, a light assembly 216 may be used. Although optional, the light assembly 216 might be coupled with a carrier assembly 211, the carrier assembly 211 being coupled around the hose 204. For example, the light assembly 216 may have an assembly mount 220 configured to couple with a rail (or other comparable feature) 252*a* the carrier assembly 211.

The light assembly 216 may have an illumination module or the like (not viewable here) disposed within a main housing 228. The illumination module may be configured to create light beam 218. The illumination module may be powered via signal received from a power cord 268. The power cord 268 may be any suitable length needed in order to connect with a power source (not shown here), and at the end thereof may have a respective plug 226 for plugging into the power source.

Just the same, the assembly mount 220 may be configured to couple directly onto the hose 204. For example, FIG. 2B shows an embodiment where the light assembly 216 may be coupled directly with the hose 204. To aid attachment one or more bands or straps 222 may be disposed around the mount 220 and the hose 204. There may be a securing member or knob 224 that also helps aid attachment of the mount 220 to another surface (such as the carrier 211 [or its rail 252*a*]).

The light assembly 216 may have one or more sacrificial lenses (not viewable here), any of which may be detachably removed from the assembly via pull tab 236. This way, diffusion from undesired pitting may be mitigated.

Figure 3A:
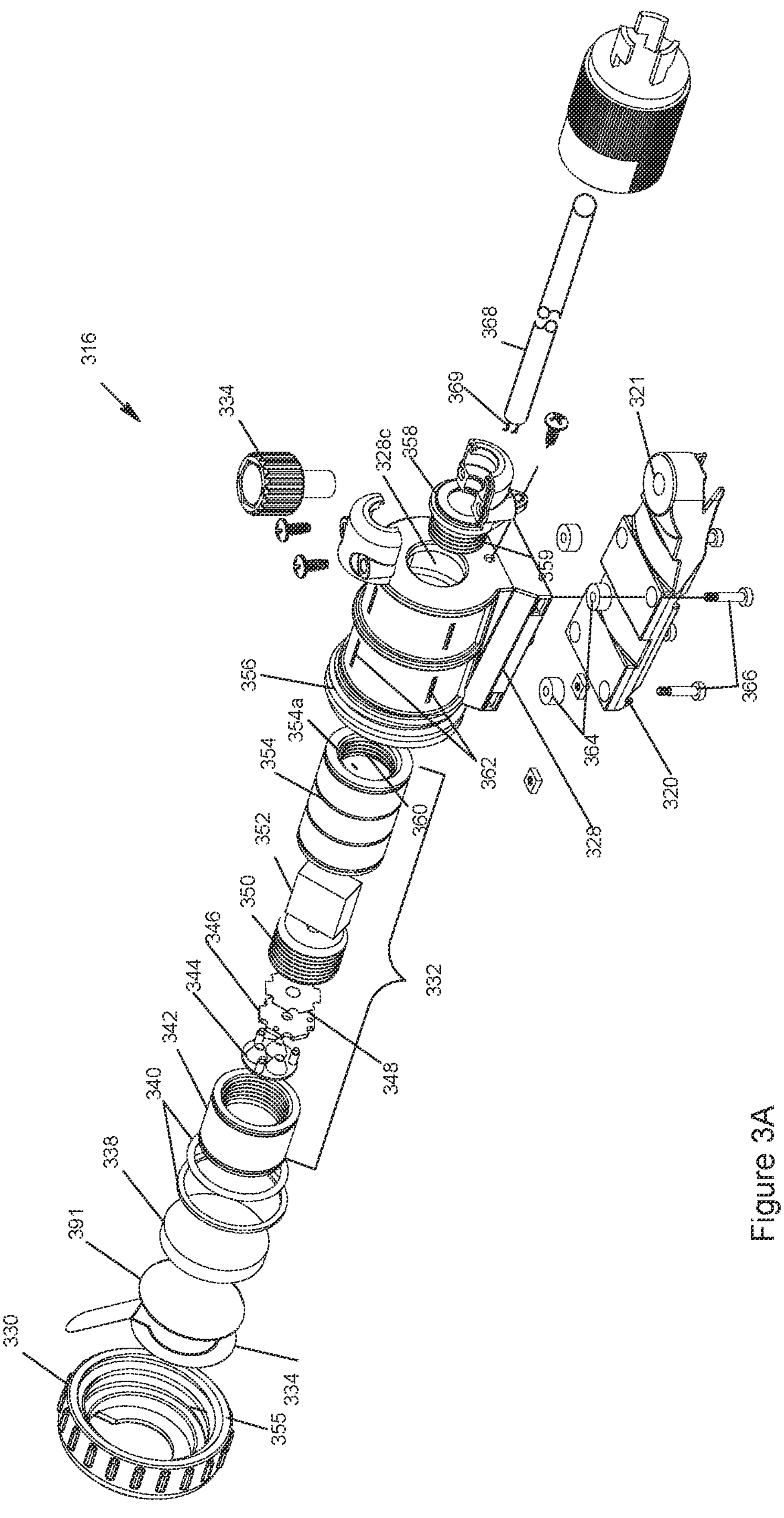
FIG. 3A shows an isometric component breakout view of a light assembly according to embodiments of the disclosure.
Figure 3B:
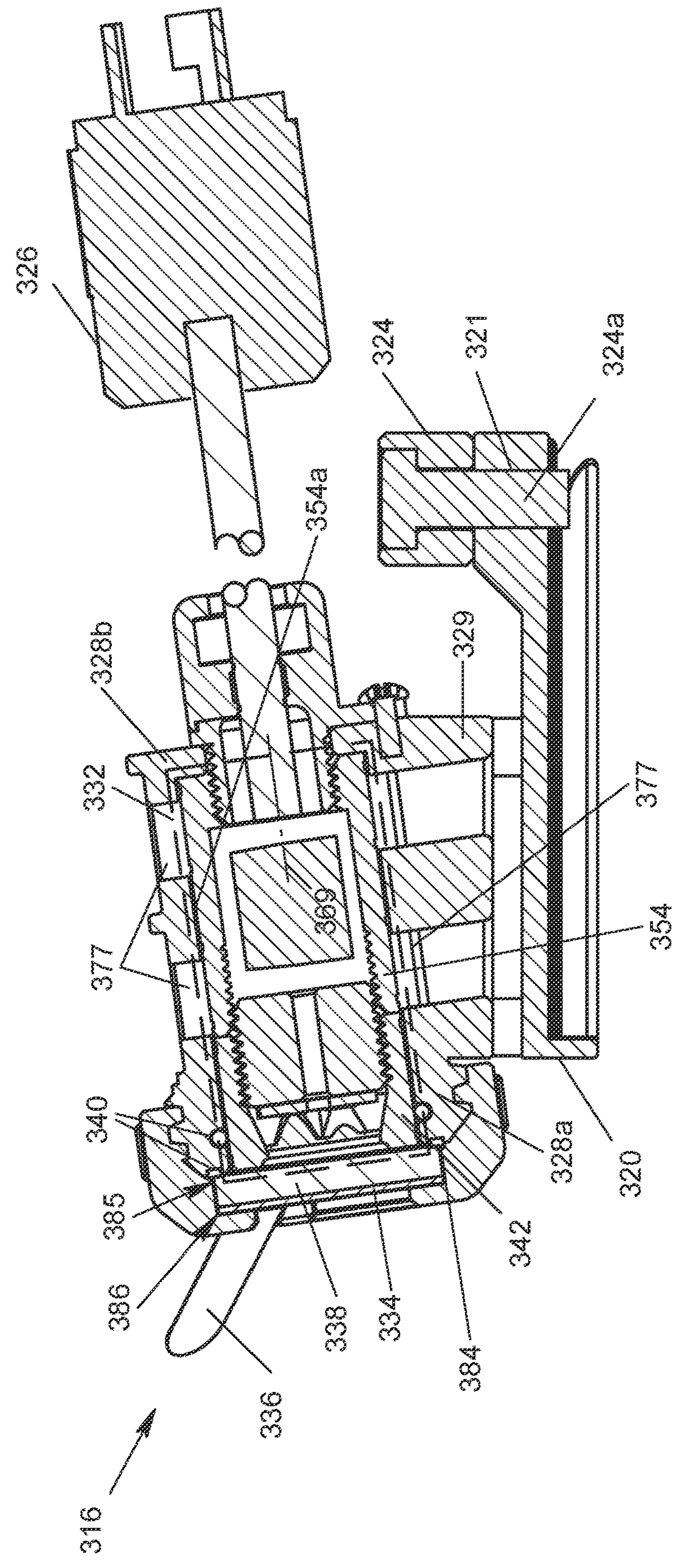
FIG. 3B shows a longitudinal side cross-sectional view of a light assembly according to embodiments of the disclosure.

Referring now to FIGS. 3A and 3B together, an isometric component breakout view of a light assembly and a longitudinal side cross-sectional view of a light assembly, respectively, illustrative of embodiments disclosed herein, are shown. FIGS. 3A and 3B together show a light assembly 316 may have one or more components or subcomponents associated therewith, one or any of which may be integral to another or separate as shown here.

The light assembly 316 may be a generally durable item such that it may be used in rugged environments. For example, the light assembly 316 may be used with an industrial operation, such as an abrasive blasting operation (200). The components or subcomponents of the light assembly 316 may be made of any suitable material, such as alloys, plastics, metals, etc. Components may be coupled together, such as via threading (or other mating features) or securing members 366 (screws, etc.). One or more components may be coupled together with one or more sealing members or o-rings 340 disposed therebetween in respective grooves or slots (see, e.g., 476, FIG. 4A).

The light assembly 316 may have a main or first housing 328. The main housing 328 may be a body with a first housing end 328*a* and a second housing end 328*b*. The housing 328 may be configured for one or more other components to fit therein, such as an illumination module 332 disposed within housing bore 328*c*.

The illumination module 332 may include whatever components might be needed to generate a beam of light (218). As shown here, the illumination module 332 may include a module housing 354 having its own module housing bore 354*a*. The module housing 354 (illumination module 332) and the main housing 328 may have one or more contact points (such as at an outer surface 354*a*).

Within the bore 354*a* there may be a LED or other type of illumination driver 352 operably connected with a power source. As shown here the illumination driver 352 may be operably connected (via wiring or other suitable mechanism 369) with an electrical power cord 368, which may be of any length needed to plug into an electrical power source. The cord 368 may have a plug 326 suitable to engage the electrical power source. Other modes of power might be used, such as a battery, a hand crank, or the like.

The cord 368 may be coupled with the housing via a cord coupler 358. The cord coupler 358 may have a coupler end 359 configured to engage and mate with a corresponding mating feature of the main housing 328 or module housing 354. FIG. 3B shows, for example, the coupler end 359 may be engaged with each of the main housing 328 and the module housing 354.

The illumination module 332 may include a heat sink 350, as well as an optic 344. There may be one or more plates 346, 348 disposed between the optic 344 and the driver 352.

The first plate may be a module (circuit) board 346. The optic 344 may be useful to control the shape or diffusion of the beam (e.g., 218) created by the module board 346. The board 346 may be operatively connected with the driver 352 via wiring or other circuitry. The second plate 348 may be pliable in nature, such as heat conductive tape (e.g., disposed between the module board 346 and the heat sink 350. The second plate 348 may help keep the module board 346 in place on the heat sink 350. The optic 344 may have posts configured to algin with respective holes in module board 346.

The heat sink 350 may be configured for a module cap 342 and the module housing 354 to couple therewith, such as having mating thread features or the like. The position of the module cap 342 thereon may help keep the optic 344 in place. This also allows the heat to transfer from the heat sink 350 to the module housing 354 and module end cap 342 for air cooling.

To further aid or facilitate holding components in place, a lens cap 330 may be coupled with the main housing 328. For example, the lens cap 330 may have cap threads 355 configured to engage and mate with a corresponding housing threads 356. Other suitable mating features may be used.

The coupling of the lens cap 330 and the main housing 328 may be done in a manner to form a lens cavity 384. The lens cavity 384 may be contemplated as having an innermost portion 385 and an outermost portion 386. Then, respectively, a primary lens 338 may be disposed in the innermost portion 385, whereas a sacrificial or secondary lens 334 may be disposed in the outermost portion 386.

Each of the primary lens 338 and the sacrificial lens 334 may be highly transmissive to the light generated by the module board 346. For example, the primary lens 338 and the sacrificial lens 334 may transmit at least 90 percent of light generated from the module board 346. In embodiments, the primary lens 338 may be a rigid, durable material, such as acrylic or glass. Whereas the sacrificial lens 334 may be more pliable in nature, such as a thin film plastic. The sacrificial lens 334 may be made of FEP (or fluorinated ethylene propylene) or other comparable material.

The sacrificial lens 334 may be a stack of one or more layers. The layers may be removable without having to dissemble the assembly 316, such as by pulling on a respective pull tab 336. In operation the outermost layer (see, e.g., 534*a*, FIG. 5B) of the lens 334 may be exposed to debris or other elements that pit or obfuscate the lens 334, resulting in diffusion of light from the illumination module 332. Detaching and removing the outermost layer results in a new layer becoming the outermost layer. In embodiments, the sacrificial lens 334 may be a stack of about 2 to about 12 layers. The layer may include an outer rim removably attached with an inner sheet portion.

Generally the layers may be individually stacked together without need for adhesion. The coupling of the cap 330 and the housing 328 may help keep the stack together. To remove a layer of the lens 334 one may simply grab the pull tab 336 and remove. A respective pull tab of a respective layer may have its own length, and the length of the pull tabs may get progressively longer (or shorter) in the stack, which might help a user differentiate the tab of the outermost layer.

One or more layers of the stack may have a respective pull tab, whereas one or more layers need not have a pull tab. In the event the sacrificial lens 334 (or last detachable layer of a stack) is removed, the primary lens 338 may become inadvertently exposed. To ensure protection of the primary lens 338, an insert or safety lens (or layer, sheet, etc.) 391 may be disposed proximate thereto. The safety lens 391 may be part of the stack, and thus part of the sacrificial lens 334. The safety lens need not be detachable, and need not have a respective pull tab.

The safety lens 391 may be a pliable material like that of the sacrificial lens 334 (and may be the same material). The insert lens 391 may be about the same size in diameter as that of the primary lens 338, such that the primary lens 338 is protected. The insert lens 391 is lacking of any kind of handle or pull tab in order to mitigate any inadvertent removal that might otherwise expose the primary lens 338.

Figure 5B:
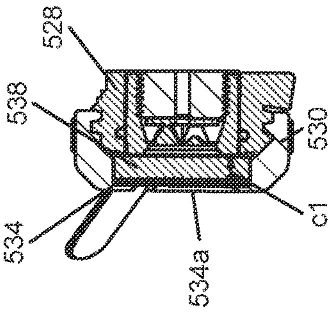
FIG. 5B shows a zoom-in side cross-sectional view of the sacrificial lens of FIG. 4A according to embodiments of the disclosure.
Figure 5D:
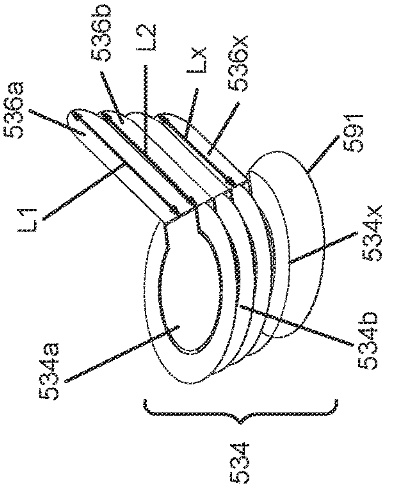
FIG. 5D shows a sacrificial lens having a plurality of layers according to embodiments of the disclosure.
Figure 5A:
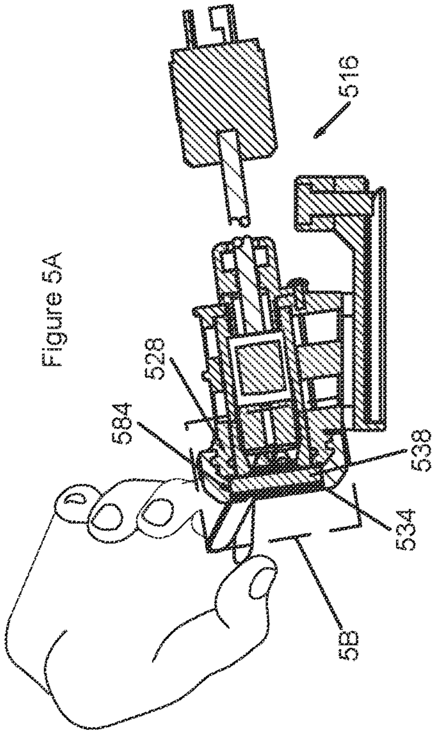
FIG. 5A shows a side cross-sectional view of a light assembly having a sacrificial lens according to embodiments of the disclosure.
Figure 5C:
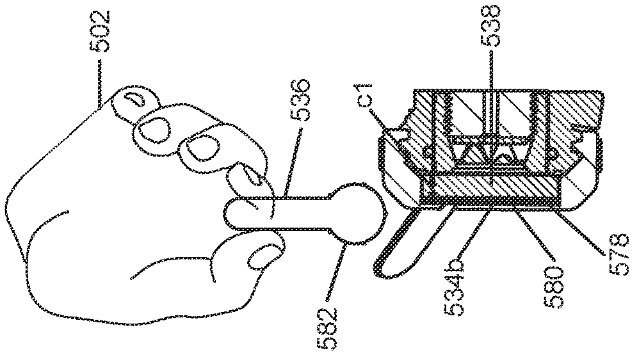
FIG. 5C shows a zoom-in side cross-sectional view of a layer removed from the sacrificial lens of FIG. 5A according to embodiments of the disclosure.

Referring briefly to FIGS. 5A, 5B, 5C together, and 5D together, a side cross-sectional view of a light assembly having a sacrificial lens, a zoom-in side cross-sectional view of the sacrificial lens, and a zoom-in side cross-sectional view of a layer removed from the sacrificial lens, a sacrificial lens having a plurality of layers, respectively, illustrative of embodiments disclosed herein, are shown. FIGS. 5A-5D together show a light assembly 516 may have one or more components or subcomponents associated therewith, one or any of which may be integral to another or separate as shown here.

The light assembly 516 may have a lens cap 530 coupled with a main housing 528. The coupling of the lens cap 530 and the main housing 528 may be done in a manner to form a lens cavity 584. The cavity 584 may include a primary lens 538 and a sacrificial or secondary lens 534 disposed therein.

The sacrificial lens 534 may be pliable in nature, such as a thin film plastic. The sacrificial lens 334 may be made of FEP (or fluorinated ethylene propylene) or other comparable material. As shown here, the sacrificial lens 534 may be a stack of one or more layers 534*a*, 534*b*, etc. The layers 534*a*, 534*b* may be removable without having to dissemble the assembly 516, such as by a user 502 pulling on a respective pull tab 536.

Detaching and removing the outermost layer 534*a* results in a new layer 534*b* becoming the outermost layer. In embodiments, the sacrificial lens 534 may be a stack of about 2 to about 12 layers. The layer 534*a* may include an outer rim (or rim portion) 578 removably attached with an inner sheet portion 582. When the sheet portion 582 is detached from cut or perforation 580, a clearance c1 within the cavity 584 remains constant. In this respect, the outer rim portion 578 remains within the cavity 584 and helps maintain the spacing and securing of the lens cap 530 and the main housing 528.

The sacrificial lens 534 may be contemplated as a stack of plurality of layers 534*a*, 534*b*, etc. FIG. 5D shows an exaggerated breakout view how each or any of the layers 534*a* to 534*x* may have a corresponding pull tab handle 536*a*, 536*b* . . . 536*x*. It may be the case that the handles 536*a*, etc. are the same length L1; however, as shown the stack 534 may include handles of different lengths. For example, the first or outermost layer 534*a* may have the longest length L1, whereas the last or innermost layer 534*x* has the shortest length Lx (or vice versa). In embodiments, the lengths may vary in length in any order.

It may be desirous to have an insert or safety lens 591, which may be a sheet or layer added as part of the stack of layers. As shown here, the safety lens 591 need not be detachable (and thus void of an outer rim). The safety lens 591 need not have a pull tab, as it may be beneficial to mitigate against inadvertent removal, thereby leaving at least one layer of protection for the primary lens 538.

Returning to FIGS. 3A and 3B, the housing 328 may have or include a mount 320 coupled therewith. Although the housing 328 and the mount 320 may be integral to each other as a unity piece, as shown here the mount 320 may be coupled with the housing 328 (or the housing platform 329). The assembly may include one or more inserts 364. The insert 364 may be akin to a bumper or spacer.

As shown here, there may be one or more inserts 364 disposed between the mount 320 and the housing 328, which may help mitigate or alleviate breakage. That is, the assembly 316 may be used in rugged environments, such as with abrasive blasting (e.g., system or process 200), where the chance for breakage from dropping, kicking, etc. may be higher. The insert(s) 364 may be pliable or flexible material, such as rubber or other comparable material, which may provide a degree of movement/flexibility or give in the event of undesired movement.

Although not shown here, the light assembly 316 may be coupled with another device (such as a blast hose, e.g., 204 or carrier assembly 611) via the mount 320. As such, the mount 320 may be configured to accommodate various surfaces, and thus may be interchangeable to other mount shapes or types. To further aid coupling there may be a knob or fastener 324 that may have a knob stem 324*a* extending in and through a stem receptacle 321, and able to engage another surface. The stem 324*a* may have desired mating features (such as threads or the like) suitable to whatever surface or device it is desired to attach the assembly 316 thereon.

The engagement of the illumination module 332 with the main housing 328 may result in passageways or clearances 377. The use of vents 362 and passageways 377 may facilitate cooling (such as via convection) of the illumination module 332 when the light assembly 316 is used.

Figure 4A:
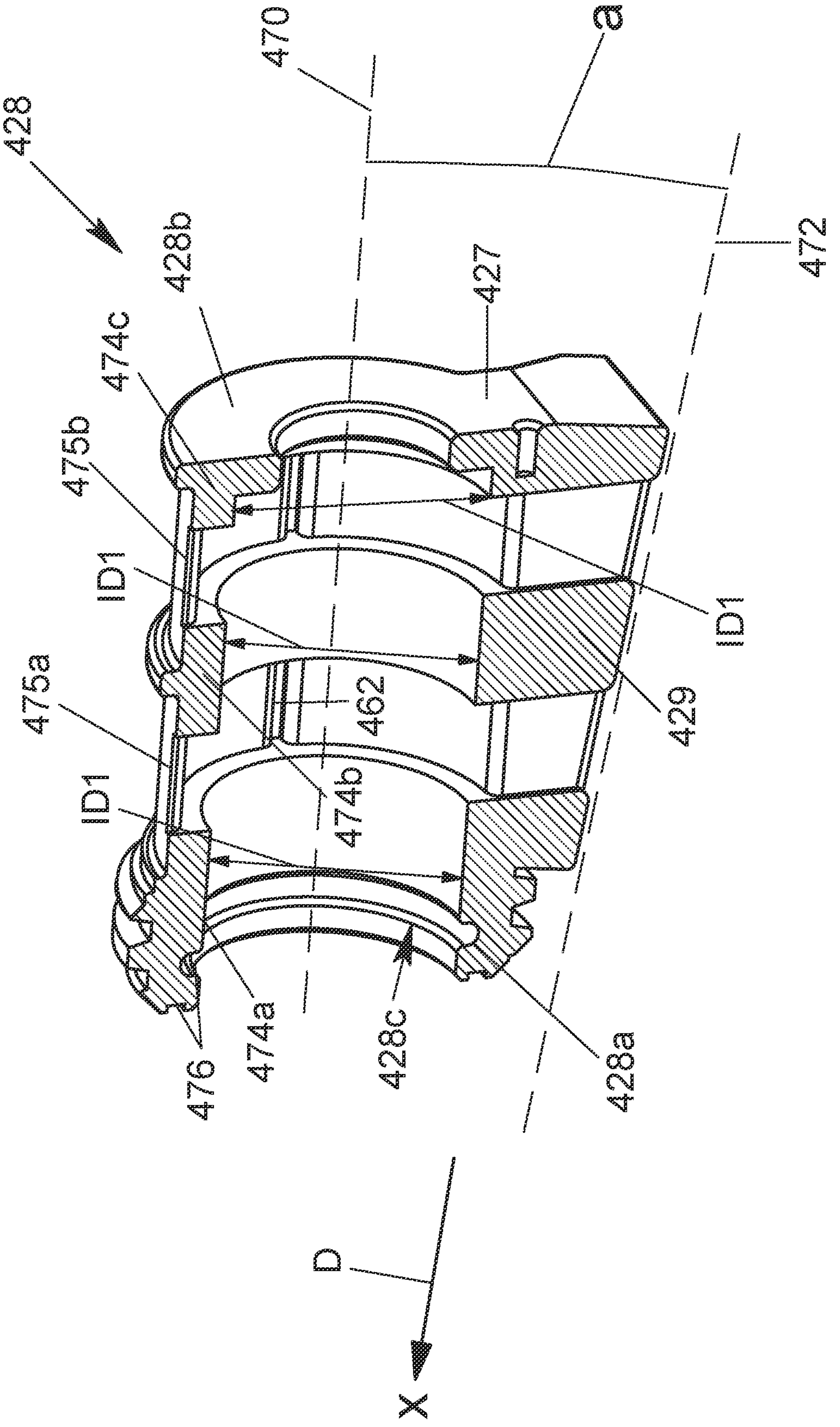
FIG. 4A shows a rotated longitudinal cross-sectional view of a main housing for a light assembly according to embodiments of the disclosure.
Figure 4B:
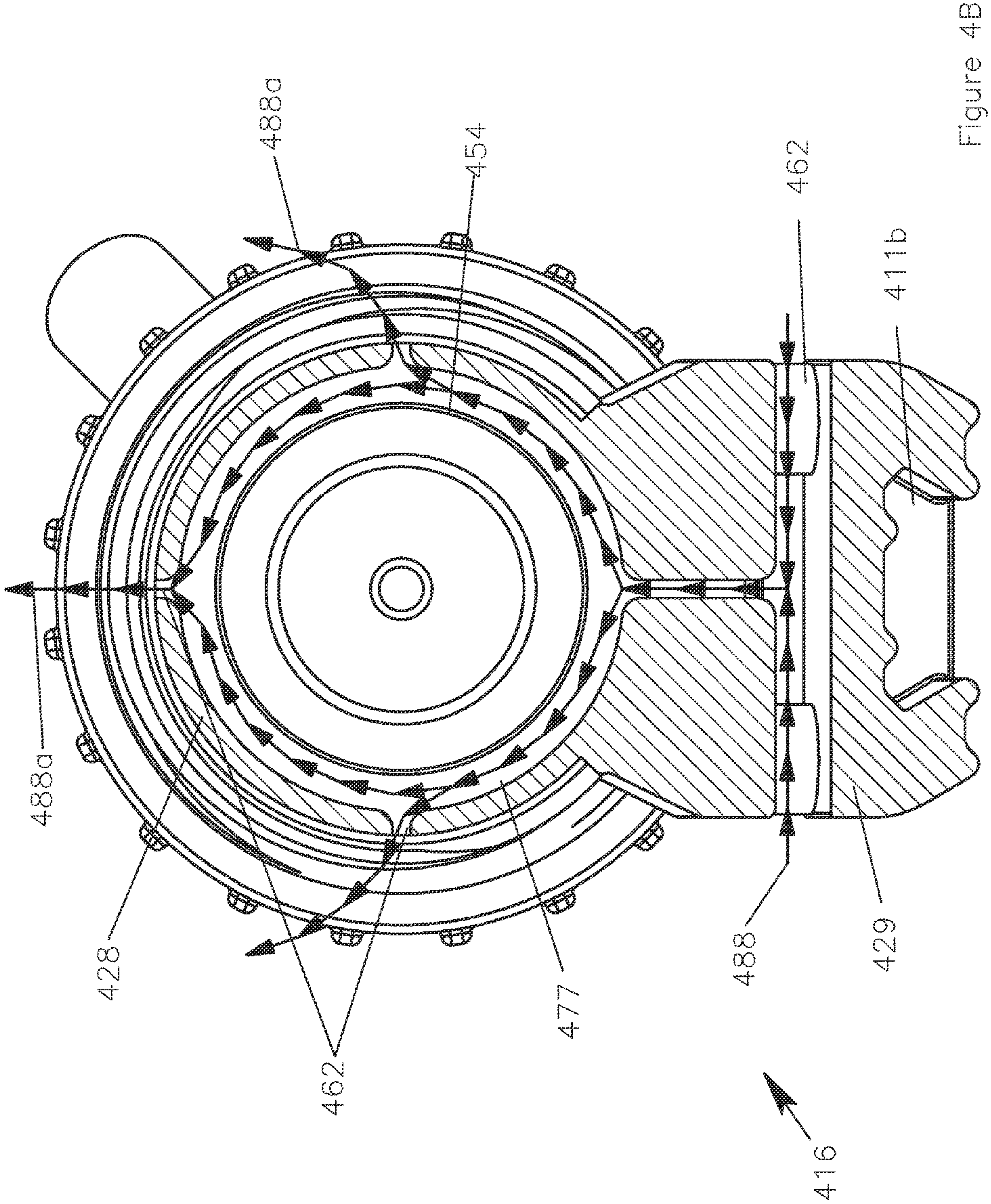
FIG. 4B shows a lateral cross-sectional view of passageway formed in a light assembly according to embodiments of the disclosure.

Referring now to FIGS. 4A and 4B together, a rotated longitudinal cross-sectional view of a main housing for a light assembly, and a lateral cross-sectional view of passageway formed in a light assembly, respectively, illustrative of embodiments disclosed herein, are shown.

FIGS. 4A and 4B together show a light assembly 416 may have one or more components or subcomponents associated therewith, one or any of which may be integral to another or separate as shown here. The light assembly 416 may be like that of other assemblies described herein (e.g., 216, etc.), with similarities and differences being discernable to one of ordinary skill in the art. For the sake of brevity, light assembly 416 may not be described in all detail.

As shown here the light assembly 416 may have a main or primary housing 428, which may have a first end 428*a* and a second end 428*b*. The main housing 428 may have a bore or hollow 428*c* as part of its hollowed body or portion 427. The bore 428*c* may provide one or more inner surfaces 474*a*, 474*b*, 474*c*, etc. with a respective inner diameter ID1. Between these surfaces may be one or more respective recessed surfaces 475*a*, 475*b* having a respective inner diameter larger than the inner diameter ID1. In this configuration, an outer surface (see 354*a*, FIG. 3B) may come into partial contact with the inner surfaces 474*a*, 474*b*, 474*c*, yet some amount of clearance or channel 477 may be present between the main housing 428 and the illumination module housing 454.

In operation, as the light assembly 416 generates heat from the illumination module (332, FIG. 3B), ambient air 488 may be drawn in via a lower vent 462 and via effects of (natural) convection provide a cooling (or heat exchange) with the illumination module housing 454. The pattern of the air flow shown here via arrows in channels 477 results in then-heated air 488*a* vented out of upper or outlet vents 462. It should be noted that natural convection will work in any blast light orientation. Primarily shown on top of hose or carrier but will also work on sides or bottom.

Coupled or integral to hollowed portion 427 may be a platform portion 429. The platform portion 429 may be configured to couple with a desired surface, such as a blast hose (see 204, FIG. 2B). In embodiments, the platform portion 429 may be configured with a particular mating feature, such as a rail slot 411*b*. The rail slot 411*b* may be configured to couple with a desired surface, as a rail feature (see 211*a*, FIG. 2A).

Although optional, as shown here the platform portion 429 may be configured with an elevation or gradient that results in an axis of illumination 470 being offset from a longitudinal or reference axis 472. Although the 470 and the axis 472 could be parallel, they may be offset by an angle a greater than zero, such as about 1 degree to about 45 degrees.

Generally the reference axis 472 may be associated with whatever device or structure the light assembly 416 may be mounted to. For example, the reference axis 472 may be associated with that of a blast nozzle (coupled with a blast hose). The axis of illumination 470 may be offset from the reference axis 472 at an angle a that results in a point of intersection X at a predetermined range of distance D in front of the blast nozzle (not shown here). In embodiments the point of intersection X may be about 20 inches to about 30 inches in front of a tip of the blast nozzle.

Figures 6A, 6B:
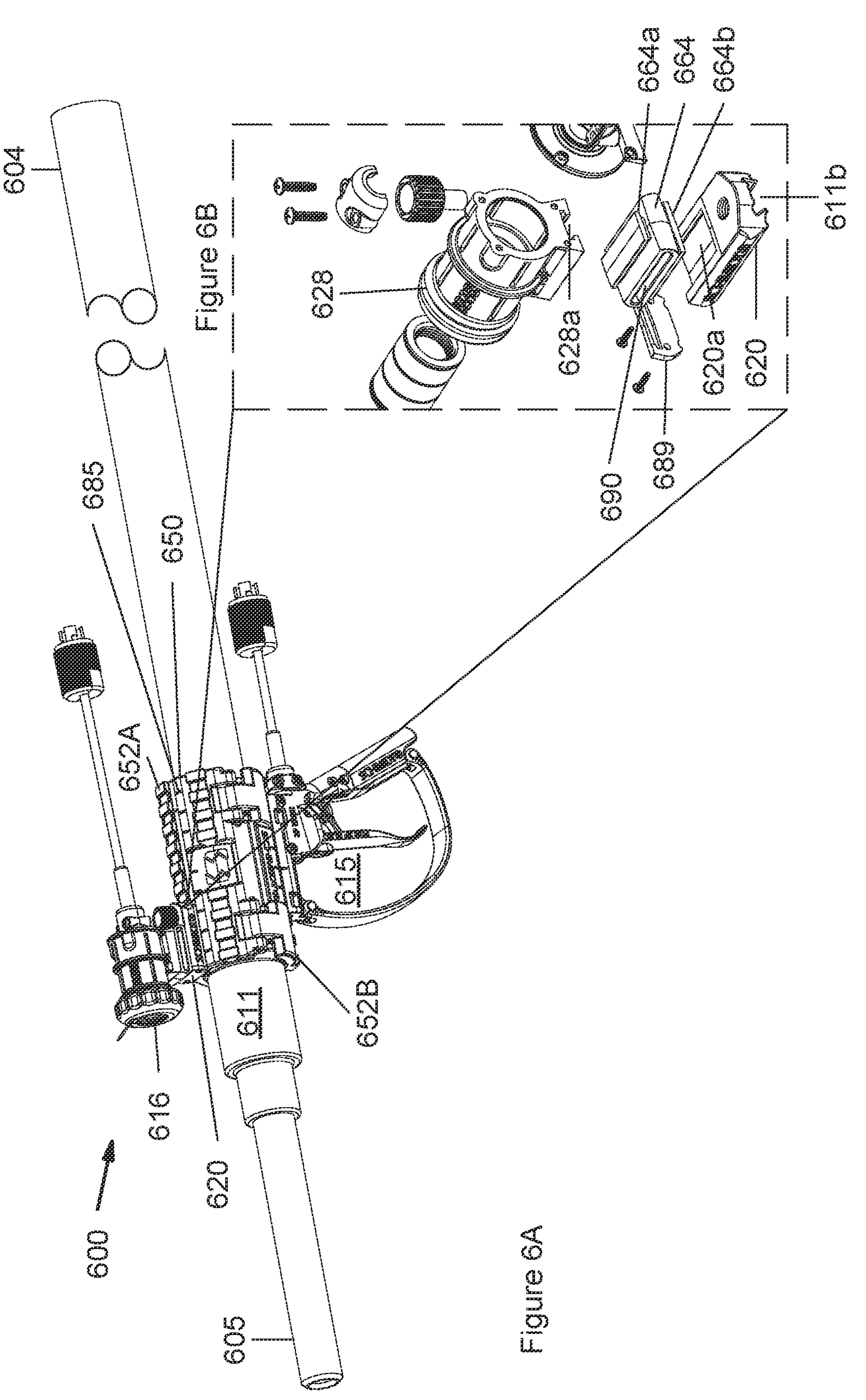
FIG. 6A shows a prospective side view of a carrier assembly closed around a blast hose according to embodiments of the disclosure.
FIG. 6B shows a partial exploded view of a blast light assembly coupled with the carrier assembly of FIG. 6A according to embodiments of the disclosure.

Referring now to FIGS. 6A and 6B together, a prospective side view of a carrier assembly closed around a blast hose and a partial exploded view of a blast light assembly coupled with a carrier assembly, respectively, illustrative of embodiments disclosed herein, are shown.

FIGS. 6A-6B illustrate an abrasive blasting system 600 for use in treating a surface. The system 600 and carrier assembly 611 may be like that of embodiments described in co-pending application, U.S. Ser. No. 18/073,225, filed Dec. 1, 2022, and incorporated herein by reference in its entirety. For the sake of this illustration, the system 600 (and related components) and carrier assembly 611 are only discussed in brevity, as the understanding and operation are discernible in view of this application and the incorporated application.

As shown here, the blasting system 600 may include a deadman assembly 615. The deadman assembly 615 may be part of or coupled with a carrier assembly 611. The carrier assembly 611 may be suitable for use with an abrasive blasting hose 604, or alternatively, any other kind of line or hose.

The carrier assembly 611 may have an elongated body 650, where the tubular nature allows for the hose 604 to fit therein. The body 650 may be made up of one or more portions that may be coupled together, whereby the assembly 611 may thus have freedom of movement (such as open and close).

The assembly 611 may have one or more guide rails 652 A/B. For example, the body 650 may have a first guide rail 652A and/or a second guide rail 652B. The guide rails 652 A/B may be an elongated slot-type structure disposed or otherwise formed along an outer assembly surface 685 of the body 650; however, the guide rails 652 A/B need not extend the full length, and may be partial in length along the outer surface 685. It is within the scope of the disclosure that rails 652 A/B may be used for accessories to couple with the 611.

For example, the deadman assembly 615 may have an upper end configured with a deadman rail slot (not shown here), which may accommodate moving (sliding) engagement onto the second guide rail 652B.

As may be desired, there may be any number of other mounts coupled with the body 650, such as (auxiliary) light assembly mount 620. The assembly mount 620 may be configured for equipment such as a light assembly 616 to couple with the assembly 611. Any such mount may attach the to the rails 652 A/B, such as by sliding, snapping, fastening, etc. (see, e.g., rail slot 611*b*)

The blast light assembly 616 may be like that of embodiments herein (e.g., 216, 316, 416, etc.), and for the sake of brevity not discussed in detail. Variant differences would be discernable to one of ordinary skill in the art. For example, the assembly may include an (coupling) insert 664, which may be akin to a bumper or spacer.

As shown here, the insert 664 may be disposed between the mount 620 and an assembly housing 628. The use of a separate insert (instead of a one-piece or unitary configuration may help mitigate or alleviate breakage. The insert(s) 664 may be pliable or flexible material, such as rubber or a poly-based material, or other comparable material, which may provide a degree of movement/flexibility or give in the event of undesired movement. The insert may have a gap or void space 690, which may also provide for more flexibility between the light housing 628 and the mount (base) 620.

The insert 664 may be configured with one or more mating features 664 *a,b*, which may be used to mate or couple the insert with respective mating features 628*a*, 620*a* of the housing 628 and the mount 620. The features 664*a*, 664*b* may be 'T' shaped, and configured to engage a slot feature. The insert 664 may be held in place with the mount 620 via a clamp or plate 689 engaged and secured thereagainst.

Advantages

Embodiments of the disclosure may provide for a fast, reliable way of replacing a worn-out or pitted lens of a light assembly. Embodiments of the disclosure may provide for improved heat dissipation.

While preferred embodiments of the disclosure have been shown and described, modifications thereof may be made by one skilled in the art without departing from the spirit and teachings of the disclosure. The embodiments described herein are exemplary only and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A light assembly comprising:
a main housing;
an illumination module disposed within the main housing;
an end cap coupled with the main housing in a manner to form a lens cavity proximate a forward end of the illumination module;
a primary lens disposed in an innermost portion of the lens cavity;
a sacrificial lens disposed proximate the primary lens in an outermost portion of the lens cavity,
wherein the sacrificial lens comprises a plurality of removable layers.

2. The light assembly of claim 1, wherein one or more of the plurality of removable layers comprises an outer rim detachably coupled with a pliable sheet having a thickness in a range of 2 mils to 8 mils.

3. The light assembly of claim 2, wherein each of the one or more pliable sheets comprises a pull tab extending out of the main housing.

4. The light assembly of claim 1, wherein the main housing further comprises an at least one recessed inner surface configured with a vent.

5. The light assembly of claim 4, wherein the illumination module comprises an illumination module housing configured with an outer surface, and wherein a passageway exists between an outer surface and the at least one recessed inner surface.

6. The light assembly of claim 5, wherein during operation of the light assembly the passageway facilitates cooling of the illumination module.

7. The light assembly of claim 1, wherein an at least one insert is disposed between the main housing and the mount.

8. The light assembly of claim 7, wherein the at least one insert comprises a plurality of inserts, and wherein each of the plurality of inserts is made of a pliable material.

9. An abrasive blasting system comprising:
a blast hose;
a light assembly coupled with the blast hose, the light assembly further comprising:
a main housing;
a mount coupled between the blast hose and the main housing;
an illumination module disposed within the main housing;
an end cap coupled with the main housing in a manner to form a lens cavity proximate a forward end of the illumination module;
a primary lens disposed in an innermost portion of the lens cavity;
a sacrificial lens disposed proximate the primary lens in an outermost portion of the lens cavity,
wherein the sacrificial lens comprises a plurality of removable layers.

10. The abrasive blasting system of claim 9, wherein at least one insert is disposed between the main housing and the mount.

11. The abrasive blasting system of claim 10, wherein an at least one of the plurality of removable layers comprises an outer rim detachably coupled with a pliable sheet having a thickness in a range of 2 mils to 8 mils.

12. The abrasive blasting system of claim 11, wherein each pliable sheet comprises a pull tab extending out of the main housing, and wherein the sacrificial lens comprises a safety lens adjacent to the primary lens.

13. The abrasive blasting system of claim 12, wherein each pull tab of each pliable sheet comprises a pull tab handle length having a decreasing length, wherein the safety lens is void of a respective pull tab, and wherein the main housing further comprises an at least one recessed inner surface configured with a vent.

14. The abrasive blasting system of claim 13, wherein the illumination module comprises an illumination module housing configured with an outer surface, and wherein a passageway exists between an outer surface and the at least one recessed inner surface.

15. A light assembly comprising:

a main housing;

a mount coupled with the main housing;

an illumination module disposed within the main housing;

an end cap coupled with the main housing in a manner to form a lens cavity proximate a forward end of the illumination module;

a first lens disposed in an innermost portion of the lens cavity;

at least one insert disposed between the main housing and the mount; and a sacrificial lens disposed proximate the first lens in an outermost portion of the lens cavity, wherein the sacrificial lens comprises a plurality of removable layers.

16. The light assembly of claim 15, wherein the first lens comprises a plurality of sheets, each of the plurality of sheets having a respective thickness in a range of 2 mils to 8 mils.

17. The light assembly of claim 15, wherein the first lens is a single rigid piece made of a durable material.

18. The light assembly of claim 15, wherein the main housing further comprises an at least one recessed inner surface configured with a vent.

19. The light assembly of claim 15, wherein the plurality of removable layers comprise a stack of pliable sheets, wherein each of the pliable sheets has a respective pull tab handle, and wherein an outermost pliable sheet has a greater pull tab handle length then any other pull tab.

* * * * *